United States Patent
O'Malley

(10) Patent No.: US 12,358,180 B2
(45) Date of Patent: Jul. 15, 2025

(54) PROCESS FOR PRODUCING A NON-WOVEN GRASS FIBRE PRODUCT

(71) Applicant: George O'Malley, County Mayo (IE)

(72) Inventor: George O'Malley, County Mayo (IE)

( * ) Notice: Subject to any disclaimer, the term of this patent is extended or adjusted under 35 U.S.C. 154(b) by 265 days.

(21) Appl. No.: 17/925,504

(22) PCT Filed: May 17, 2021

(86) PCT No.: PCT/EP2021/063033
§ 371 (c)(1),
(2) Date: Nov. 15, 2022

(87) PCT Pub. No.: WO2021/229107
PCT Pub. Date: Nov. 18, 2021

(65) Prior Publication Data
US 2023/0182344 A1    Jun. 15, 2023

(30) Foreign Application Priority Data
May 15, 2020    (GB) ..................................... 2007223

(51) Int. Cl.
*B27N 3/04*    (2006.01)
*B27N 3/12*    (2006.01)
*C08L 97/02*    (2006.01)
*D21B 1/00*    (2006.01)

(52) U.S. Cl.
CPC ................. *B27N 3/04* (2013.01); *B27N 3/12* (2013.01); *C08L 97/02* (2013.01); *D21B 1/00* (2013.01)

(58) Field of Classification Search
None
See application file for complete search history.

(56) References Cited

FOREIGN PATENT DOCUMENTS

| | | |
|---|---|---|
| CN | 109610015 A | 4/2019 |
| GB | 335052 A | 9/1930 |
| WO | WO-2010/146355 A1 | 12/2010 |

*Primary Examiner* — Shawn Mckinnon
(74) *Attorney, Agent, or Firm* — Morse, Barnes-Brown & Pendleton, P.C.; Martin Z. Zhang

(57) ABSTRACT

A process for producing a non-woven grass fibre product comprises providing a grass fibre biomass obtained by aerobic fermentation of a meadow grass slurry and removal of digestible elements released during aerobic fermentation, mixing and shaping the grass fibre biomass to form a non-woven grass fibre mat, and binding and drying the mat to form the non-woven grass fibre product. The process includes a step of addition of non-fermented grass to the grass fibre biomass prior to the mixing and shaping step in which the mixture of grass and grass fibre biomass contains 15-50% by weight of grass. The use of a non-woven grass fibre product of the invention as thermal and acoustic insulation material for a building or a vehicle, as a packaging material for industrial products such as engines, industrial machines, and parts thereof, and as a filler for a mattress, is also described.

15 Claims, No Drawings

PROCESS FOR PRODUCING A NON-WOVEN GRASS FIBRE PRODUCT

CROSS REFERENCE TO RELATED APPLICATIONS

This patent application is the national stage of International Patent Application No. PCT/EP2021/063033, filed on May 17, 2021, which claims the benefit and priority of United Kingdom Application No. 2007223.7, filed on May 15, 2020. The disclosures of both applications are incorporated by reference herein in their entirety.

FIELD OF THE INVENTION

The present invention relates to a non-woven grass product, for example a board or a mat, and uses of the product. The invention also provides a non-woven grass product formed according to the process of the invention.

BACKGROUND TO THE INVENTION

The use of grass fibres to produce non-woven materials is described in the literature, for example in FR2294648 and WO2005017251. U.S. Pat. No. 8,110,070 describes a process for manufacturing grass fibre elements including rigid and flexible mats that employs an airlay non-woven manufacturing process. The grass fibre is prepared by mixing grass and a large amount of water to form a slurry, and them mechanical treatment of the slurry using a hammer mill or shredder to separate the fibrous part of the grass from the digestible parts to provide a fibrous fraction containing a high amount of added moisture (about 50-70% moisture by weight). The fibrous fraction is then dried to reduce the moisture content, a fire retardant is then added before thermally activatable man-made binding fibres such as polyethylene or polypropylene fibres are added, whereupon the mixture of fibres is processed using air lay technology to form a non-woven mat having a density of 30-50 kg/m3 which is then treated with an additive. The mats are used for thermal and acoustic insulation. A problem with the process is that it is energy intensive due to the mechanical defibering step, and the requirement for man-made binding fibres renders the product not fully biodegradable. In addition, the process has a high requirement for water (on average, about 4 tonnes of clean water is required to produce 1 tonne of dry fibre) and results in the digestible fraction of the grass being provided as a dilute liquid of little commercial value due to the low concentration of the solutes.

CN108189192 and CN108214811 describe the use of fermented wheat grass to produce high-density boards used for building materials. Both documents describe the boards as being produced using heat and pressure in molds (i.e. compression molding) which results in particle boards (also known as MDF) with good mechanical properties and bending strength. The boards could not be described as flexible mats and, due to the manner of production using compression, would not be suitable for use as thermally or acoustically insulating.

It is an object of the invention to overcome at least one of the above-referenced problems.

SUMMARY OF THE INVENTION

The Applicant has addressed the problems of the prior art by providing a process for producing non-woven grass fibre products that does not require the mechanical defibering processing of the prior art. The process comprises the steps of:
  providing a grass fibre biomass obtained by aerobic fermentation of a grass slurry and removal of digestible elements released during aerobic fermentation;
  mixing and shaping the grass fibre biomass to form a non-woven grass fibre mat, and
  binding and drying the mat to form the non-woven grass fibre product.

The use of natural fermentation to form the grass fibre biomass avoids the expensive energy intensive mechanical de-fibering process of the prior art and the high-water requirement, and also avoids the generation of a dilute digestible fraction of low commercial value.

The process generally comprises a step of addition of non-fermented grass to the grass fibre biomass prior to the mixing and shaping step. Thus, the method and products of the invention generally employs grass fibre biomass (fermented) and also non-fermented grass to give structure and rigidity. Generally at least 20% by weight of non-fermented grass is employed in the method and products of the invention. The non-fermented grass is generally selected from sisal, hemp and flax grass. Two or more non-fermented grasses may be added to the grass fibre biomass, for example hemp and sisal, hemp and flax, or sisal and flax. The non-fermented grass is generally size-reduced to a size of 5 to 40 mm. The non-fermented grass may take the form of grass fibres, for example fibres produced by decortication of the grass. Decortication is a well-known process where the plants are treated to separate the plant fibres from the woody or pulpy matter with which the fibres are associated. Decortication is described in U.S. Pat. No. 7,669,292.

In addition, the Applicant has discovered that certain aspects of the process of the invention provide mats that provide improved thermal and/or acoustic properties over the mats of the prior art.

In any embodiment, the grass fibre biomass is produced in the process comprising the steps of:
  mixing grass and an aqueous liquid to provide a slurry;
  incubating the slurry under conditions to allow aerobic fermentation of the grass to provide a grass fibre biomass solid phase that is depleted in digestible elements dispersed in a liquid phase; and
  separation of the solid phase from the liquid phase to provide the grass fibre biomass.

In any embodiment, the grass fibre biomass is predominantly produced from meadow grass (i.e. mown grass). Typically, at least 60%, 70%, 80%, 90% or 100% of the grass fibre biomass is produced from meadow grass.

In any embodiment, the process employs dust extraction during one or more of the steps of the process to remove dust or fines. Dust extraction may be performed, for example, during any mixing step of the process, for example when the biomass is mixed with non-fermented grass, during size reduction of fibres, during any step of conveying material from one processing area to another, during a shaping step, or during a binding or drying step. In any embodiment, the meadow grass is subjected to dust extraction after being fermented into the grass fibre biomass.

In any embodiment, the process employs spark detection (e.g. one or more spark detection modules) during one or more of the steps of the process to detect sparks in the processing line. Spark detection may be performed, for example, during any mixing step of the process, for example when the biomass is mixed with non-fermented grass, during size reduction of fibres, during any step of conveying material from one processing area to another, during a shaping step, or during a binding or drying step. Spark detection may be performed using convention spark detector modules that are employed in powder processing. The process may also employ a fire extinguishing module which may be operably connected to a spark detection module for automatic actuation of the fire extinguishing module when a spark is detected by the spark detection module.

In any embodiment, the process employs a metal detection module to detect metal in the materials during one or more of the steps of the process. Metal detection may be performed, for example, during any mixing step of the process, for example when the biomass is mixed with non-fermented grass, during size reduction of fibres, during any step of conveying material from one processing area to another, during a shaping step, or during a binding or drying step.

The incorporation of one or more of fire retardant, dust removal, spark detection and fire extinguishing ensure a more suitable substrate for the products intended and significantly de-risks the potential of self ignition/combustion/fire due to a high density of fines/dust in the process environment. The removal of dust also makes for a safer working environment for plant operators by removing the need for a close interface between this initial grass fibre material and plant operators.

In any embodiment, the grass slurry is made by mixing grass with aqueous liquid (for example water) in a ratio of 1:1 to 50:1. The grass generally contains moisture at levels of up to 40% or 50% by weight of the grass. The aerobic fermentation step employs fermentative microorganisms naturally present in the grass. In any embodiment an additional microbial starter may be employed, which may be an aliquot of a grass fibre biomass prepared previously. In any embodiment, the fermentation step may be a batch fermentation or a continuous fermentation. In any embodiment, the fermentation step may be performed at room temperature. In any embodiment, the fermentation step may be performed at a temperature and for a period of time to allow aerobic digestion of the grass by the fermentative microorganisms. In any embodiment, the grass fibre biomass solid phase is separated using a suitable separation step, for example by filtration or centrifugation.

In any embodiment, the grass fibre biomass is treated to size reduce the grass fibres in the biomass, typically to a grass fibre size of 1-45 mm, 1-40 mm, 5-45 mm, 5-40 mm, 1-30 mm, 5-30 mm, 10-30 mm, 20-30 mm, 1-20 mm, 5-20 mm, 10-20 mm, 1-10 mm, 1-5 mm or 5-10 mm.

In any embodiment, the grass fibre biomass is washed.

In any embodiment, a flame retardant is added to the grass fibre biomass (before or after non-fermented grass is added), for example 1-20%, 5-15% or about 8-12% by weight. Examples of fire retardants include borates such as boric acid and borate salts (American Borate Company). The fire retardant may be added by spraying.

The fire retardant may be added to the grass fibre biomass, to the non-fermented grass, or both, or to the mixture of grass fibre biomass and non-fermented grass. Fire retardant may be added at one or more steps of the process, for example during production of the grass fibre biomass and/or non-fermented grass, and during a later step of shaping, binding or drying step.

In any embodiment, the grass fibre biomass is dried and/or pressed to reduce the moisture content, typically to about 5-15% by weight.

In any embodiment, the grass fibre biomass is treated by a membrane separation process to reduce the levels of mineral salts and lactic acid. In any embodiment, the membrane filtration step is nanofiltration.

In any embodiment, the grass fibre biomass that is mixed with non-fermented grass that typically has a moisture content by weight of about 5-50%, 5-40%, 5-30%, 5-20%, 5-15%, 10-50%, 10-40%, 10-30%, 10-20%, 20-50%, 20-40% or 20-30%. In any embodiment, the process comprises automatic of metering of non-fermented grass and grass fibre biomass. The process may employ a metering module configured to meter predetermined amounts of the non-fermented grass(es) and grass fibre biomass into a vessel for mixing. The metering module may comprise a weighing module.

In any embodiment the non-fermented grass is selected from sisal, hemp, cereal or flax grass.

In any embodiment, the non-fermented grass is size reduced prior to addition to the biomass, typically to a grass fibre size of 1-45 mm, 5-45 mm, 1-30 mm, 5-30 mm, 10-30 mm, 20-30 mm, 1-20 mm, 5-20 mm, 10-20 mm, 1-10 mm, 1-5 mm or 5-10 mm.

In any embodiment, the process comprises automatic recovery of offcuts generated during grass (fermented or non-fermented) size reduction step(s).

In any embodiment, the mixing and shaping step employs an air lay process. In one embodiment, the non-woven manufacturing process (typically the airlay process) comprises a dust extraction step. Other methods for forming non-woven mats may be employed, for example spreading, carding and direct fleece methods. The details of these processes will be known to a person skilled in the field non-woven materials production.

In any embodiment, the mixing and shaping steps are configured to provide a non-woven grass fibre mat with a density of 30-80 Kg/m$^3$ or 30-50 kg/m$^3$.

In any embodiment, the mixing and shaping steps are configured to provide a non-woven grass fibre mat with a thickness of 0.5 to 150 cm.

In any embodiment, the binding step comprises adding a binder to the non-woven grass fibre mat. The binder is generally added during drying. In any embodiment, the binder is added at an amount of about 5-15% or about 8-12% or about 10% by weight of the non-woven grass fibre mat. Suitable binders include starch, casein, latex, cellulose derivatives, synthetic resins.

In any embodiment, the invention comprises a step of encasing the product in an outer layer, for example an outer film layer or an outer mesh layer.

In another aspect, the invention also provides a non-woven grass fibre product obtained according to the process of the invention.

In another aspect, the invention provides a non-woven grass fibre product comprising aerobically fermented grass fibres that are depleted in digestible material and a binder. In any embodiment, the non-woven grass fibre product comprises non-fermented grass. Generally at least 5% or 10%, for example 10-50% (for example 5-50%, 5-40%, 5-30%, 5-20%, 5-15%, 10-50%, 10-40%, 10-30%, 10-20%, 20-50%, 20-40% or 20-30%) by weight of the solids in the non-woven grass fibre product is non-fermented grass.

The product may have a density of 30-80 kg/m$^3$.

The product may be a flexible, semi-rigid, or rigid.

The product may take the form of a mat or a block.

The product may be shaped into a panel suitable for use in a vehicle, for example door or roof panels for a vehicle cockpit, or an insulating panel for a vehicle engine bay.

The product may take the form of an acoustic or thermally insulation panel, which panel may be configured for retrofitting to a wall, ceiling or sloped roof of a room or building to acoustically and/or thermally insulate the room/building. It may also be employed in a void space in a wall of a wood frame building to thermally and/or acoustically insulate the building.

The product may take the form of mattress or a cushion (or a filler therefore) for a chair or sofa.

The product may take the form of a packaging for an article, especially a heavy-duty industrial article such as an engine, engine part, machine, or machine part.

Generally, the packaging product is configured for use with articles that weigh more than 1, 5, 10, 15, 20, 30 or 40 Kg.

In another aspect, the invention provides a thermal insulation product for use in a vehicle or a building comprising a non-woven grass fibre product of the invention.

In another aspect, the invention provides an acoustic insulation product for use in a vehicle or a building comprising a non-woven grass fibre product of the invention.

In another aspect, the invention provides a packaging for industrial items comprising a non-woven grass fibre product of the invention.

In another aspect, the invention provides the use of a non-woven grass fibre product of the invention as a thermally insulting material. The thermally insulating material may be configured for use in buildings (for example thermal insulation for walls or roofs). The thermally insulating material may be configured for use in vehicles (for example cars, trucks, boats, aeroplanes), for example panels for use in a vehicle cockpit or an engine bay.

In another aspect, the invention provides the use of a non-woven grass fibre product of the invention as an acoustically insulting material. The acoustically insulating material may be configured for use in buildings (for example acoustic insulation for walls or roofs). The acoustically insulating material may be configured for use in vehicles (for example cars, trucks, boats, aeroplanes), for example panels for use in a vehicle cockpit or an engine bay.

In another aspect, the invention provides the use of a non-woven grass fibre product of the invention as a packaging material, especially a packaging material for heavy duty industrial products such as engines and engine parts.

In another aspect, the invention provides the use of a non-woven grass fibre product of the invention as a mattress for a bed or a filler for cushions in a chair or sofa.

In another aspect, the invention provides a system for producing a non-woven grass fibre product, comprising:
  a fermentation module configured to produce grass fibre biomass by aerobic fermentation of a meadow grass slurry and removal of digestible elements released during aerobic fermentation;
  a non-fermented grass size reduction module to receive non-fermented grass and size reduce the non-fermented grass;
  optionally, a metering module operably connected to the fermentation module and non-fermented grass size reduction module configured to automatically meter predetermined amounts of the grass fibre biomass and non-fermented grass;
  a mixing and shaping module (e.g. an airlay machine) operably connected to the metering module (or fermentation module and size reduction module) and configured to receive the predetermined amounts of the grass and grass fibre biomass and mix and shape to form a non-woven grass fibre mat; and
  a binding and drying module operably connected to the mixing and shaping module and configured to receive the non-woven grass fibre mat form the mixing and shaping module and add binder to the mat and dry the mat.

In any embodiment, the system comprises a size reduction module configured to receive grass fibre biomass from the fermentation module, size reduce the biomass, and deliver the size-reduced biomass to the metering module (or the mixing and shaping module).

In any embodiment, one or more of the non-fermented grass size reduction module, metering module, mixing and shaping module, and binding and drying module includes a dust extraction module.

In any embodiment, one or more of the non-fermented grass size reduction module, metering module, mixing and shaping module, and binding and drying module includes a spark detection module.

In any embodiment, one or more of the non-fermented grass size reduction module, metering module, mixing and shaping module, and binding and drying module includes a metal detection module.

In any embodiment, one or more of the non-fermented grass size reduction module, metering module, mixing and shaping module, and binding and drying module includes a fire extinguishing module.

In any embodiment, one or more of the non-fermented grass size reduction module, metering module, mixing and shaping module, and binding and drying module includes a fire retardant addition module.

In any embodiment, the system comprises conveyors configured to convey material between modules. In any embodiment, the or each conveyor comprises dust extraction modules.

The Applicant has discovered that certain aspects of the process of the invention provide mats that provide improved thermal and/or acoustic properties over the mats of the prior art. One such aspect of the invention allows for an improvement in the flame retardancy of the finished product through the in-line spray application of certain environmentally safe substances having flame/fire retardancy characteristics.

The plant will generally be automatic. The bales will generally be placed automatic tippling through to cutting at the end of the line after the oven. Typically, all edge trim will be removed reopened and fed back into the shaping step/machine (e.g. airlay machine).

In one embodiment, two distinct opening feeder lines will operate.

1) One line will consist of the correct amount of opening and dedusting equipment to remove dust and fines from the meadow grass. This will contain a strategically positioned spark and extinguishing device, along with metal detection/diverter valves. Each part of the equipment will have fibre transportation by condenser which pulls fibre through from the previous machine and deposits the fibre into the following machine the excess air is fed to the filtration plant.

Air change rate external to the equipment will be around 20 times per hour to not only collect dust laden air but also be sent back to be washed and returned to the room under the correct conditions.

2) The second line will have a shorter route bale breaker and opener fed into a fine opener into a weighing device to ensure correct fibre blend ratios on to a blend bin where it will be united with the grass and the blend will be homogeneously blended to give product uniformity. This line/dosage point will be used to feed in the additional 2 fibre types The correctly blended fibre mix will then be fed into an Airlay batt forming device, then into an oven to cure the biocomponent fibre onto a slitting (crosscut and inline cut) and finally stacking.

Other aspects and preferred embodiments of the invention are defined and described in the other claims set out below.

DETAILED DESCRIPTION OF THE INVENTION

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

"Grass fibre biomass" refers to a grass fibre product that is produced from a grass slurry (generally a mixture of meadow grass and an aqueous liquid such as water) that is subjected to aerobic fermentation under conditions that allow the fermentative microorganisms naturally present in the grass ferment the grass to provide a slurry containing a grass fibre biomass solid phase and a liquid phase. The solid phase contains grass fibre biomass that is depleted in digestible components (i.e. nutrients) and the liquid phase contains the digestible components. The solid phase is separated from the liquid phase to provide the biomass that is used in the process of the invention. The separated solid phase is generally treated to remove water (pressing and/or drying) and may also be washed and subjected to a membrane filtration process to remove minerals and organic acids. The resultant biomass is highly depleted in unwanted materials such as nutrients and is enriched in lignocellulosic material suitable for forming non-woven materials. A process for producing a grass fibre biomass is described in WO2012/023848, in particular examples 1 and 2.

"Mixing and shaping the grass fibre biomass to form a non-woven grass fibre mat" refers to a process in which the biomass optionally in combination with other ingredients such as a flame retardant, binder and non-fermented grass is formed into a 3-D web using convention non-woven processing such as airlaid, wetlaid or carding/crosslapping process. The process generally involves arranging the material on to a conveyor in the form of a mat and chemically or mechanically processing the mat to allow the fibres adhere together. Typically, the process includes one or more of a dust extraction step, spark detection and metal detection. Binder is generally added, and the mat dried to form the non-woven product. In an airlaid process, the fibres are mixed with air to form a uniform air-fibre mixture which is deposited on a moving air-permeable belt. Processing of fibrous material to produce non-woven materials is described on the World Wide Web at sciencedirect.com/topics/engineering/airlaid.

"Non-woven grass fibre mat" refers to the product produced from the grass fibre biomass (optionally combined with other ingredients such as the added non-fermented grass(es)) after the mixing and forming process (for example an air lay process). The mat generally has a density of 30-80 kg/m$^3$. The mat may have a thickness of 1-200 cm, for example 1-200, 5-200, 5-150, 50-200, 50-150 cm. When used as insulation, the mat may have a thickness of 10-150 cm, 50-150 cm or 100-150 cm. When used as a paneling for a vehicle, the mat may have a thickness of 10-80 cm or 20-80 cm. When used as a packaging material, the mat may have a thickness of 5-50 cm, 5-30 cm, 50-20 cm or 5-15 cm. When used as a paneling for a vehicle, the mat may have a density of 300-550 g/m$^2$ at a thickness of 20 mm. When used as a packaging material, the mat may have a density of 100-300, typically about 200 gram/m$^2$ at a thickness of 7 mm. When used as insulating material, the mat may have a density of 30-50 or about 40 Kg/m$^3$.

"Binder" refers to a material added to a mat product, often during the drying process, to adhere the fibres together. The binder may be added prior to or during drying. In any embodiment, the binder is added at an amount of about 5-15% or about 8-12% or about 10% by weight of the non-woven grass fibre mat. Suitable binders include starch, casein, latex, cellulose derivatives, synthetic resins.

"Non-woven grass fibre product" refers to the product obtained by drying and binding the non-woven grass fibre mat. The product typically has a density of 30-80 kg/m$^3$, and/or may have a thickness of 1-200 cm or 1-100 cm. In any embodiment, the non-woven grass fibre product comprises non-fermented grass. Generally at least 10-50% (for example 5-50%, 5-40%, 5-30%, 5-20%, 5-15%, 10-50%, 10-40%, 10-30%, 10-20%, 20-50%, 20-40% or 20-30%) by weight of the solids in the non-woven grass fibre product is non-fermented grass. The product may have a density of 30-80 kg/m$^3$. The product may be a flexible, semi-rigid, or rigid. The product may take the form of a mat or a block. The product may be shaped into a panel suitable for use in a vehicle, for example door or roof panels for a vehicle cockpit, or an insulating panel for a vehicle engine bay. The product may take the form of an acoustic insulation panel, which panel may be configured for retrofitting to a wall of a room to acoustically insulate the room. The product may take the form of mattress or a cushion for a chair or sofa. The product may take the form of a packaging for an article, especially a heavy duty industrial article such as an engine, engine part, machine, or machine part. Generally, the packaging product is configured for use with articles that weigh more than 1, 5, 10, 15, 20, 30 or 40 Kg. The product may be a thermal insulation product for use in a vehicle or a building comprising a non-woven grass fibre product of the invention. The product may be an acoustic insulation product for use in a vehicle or a building comprising a non-woven grass fibre product of the invention. The product may be a packaging for products, especially for industrial items comprising a non-woven grass fibre product of the invention. The product generally has a moisture content by weight of about 5% of less, for example 1-5%, 1-4%, 1-3%, 1-4%, 2-4%, 1-3%, 2-5%, 3-5%. In one embodiment, the product comprises an outer layer, for example an outer film or mesh layer. The film or mesh may be made from a polymer material. The outer layer can protect the product from ingress of water, and also help avoid the product breaking or being mechanically eroded.

"Meadow grass" refers to grass obtained from meadows and fields and parks (also referred to as "mown grass"). It includes grass cut from urban areas including cut lawn grass and grass cut from motorway verges.

"Non-fermented grass" refers to grass that has not been subjected to aerobic fermentation and that is mixed with the grass fibre biomass prior to mixing and forming. It is generally selected from hemp, flax, cerealor sisal grass. The added grass is generally size reduced prior to addition to the biomass, typically to a grass particle size of about 1-40 mm.

"Fire retardant material" means a material that inhibits or prevents fire or flames in the product. Examples of fire retardants include borates such as boric acid and borate salts (American Borate Company). Fire retardant is generally added after the biomass is produced. It may be added at 1-20%, 5-15% or about 8-12% by weight.

EXEMPLIFICATION

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Example 1: Preparation of Grass Fibre Biomass

A process according to a first embodiment of the invention is described in detail. The process comprises the following steps:
  A. 50 Kg meadow grass which has been freshly cut (about 65% moisture by weight) is added to a container along with 50 Kg water. The container has an outlet in the base which collects liquid phase and re-circulates it to the top of the container. The container is closed to allow aerobic fermentation of the slurry for 6-10 days.
  B. The liquid phase is drained from the bottom of the container leaving a wet grass fibre biomass depleted in digestible components. A weight is than placed on top of the biomass for several hours which compresses the biomass to further reduce the moisture content.
  C. The biomass was then placed in a press and compressed to remove moisture until the moisture was about 50% by weight.
  D. The biomass was then shredded to size reduce the grass fibres to a size of 10-20 mm.
  E. The size reduced biomass was then dried in a condenser dryer at temperatures of 45-65° C. for about 100 hours until the moisture content had reached about 10% by weight.
  F. A fire retardant (zinc borate) was sprayed onto the blocks at about 10% by weight of the biomass.

Example 2—Preparation of Grass Fibre Non-Woven Thermal Insulation Material

A. 100 Kg of decorticated hemp grass fibre was shredded in a conventional shredder to produce a grass fibre product having an average grass particle size of 10-20 mm and a moisture content of about 10-15% by weight.

B. 20 Kg of the decorticated shredded hemp grass fibre and 80 Kg of grass fibre biomass produced according to Example 1 are mixed with continuous dust extraction and then added into airlaid processing machine comprising a dust/fines extractor, spark detector and metal detector. The grass and biomass are mixed with air and the mixed fibres are deposited onto a conveyor to form an elongated non-woven mat having a density of about 40 Kg/m3 and a thickness of about 10 cm.

C. Binder (OC-Biobinder) is added to the mat at about 10% by weight and the mat is dried to provide a grass fibre non-woven product having a final moisture content of less than 5%. This product is in the form of a flexible batt suitable for use as thermal insulation for a building.

Example 3—Preparation of Grass Fibre Non-Woven Acoustic Insulation Boards

A. 100 Kg of decorticated hemp grass fibre was shredded in a conventional shredder to produce a grass product having an average grass particle size of 10-20 mm and a moisture content of about 13% by weight.

B. 40 Kg of the decorticated shredded hemp grass fibre and 60 Kg of grass fibre biomass produced according to Example 1 are mixed with continuous dust extraction and then added into airlaid processing machine comprising a dust/fines extractor, spark detector and metal detector. The grass and biomass are mixed with air and the mixed fibres are deposited onto a conveyor to form an elongated non-woven mat having a density of about 70 Kg/m3 and a thickness of about 3 cm.

C. Binder (OC-Biobinder) is added to the mat at about 10% weight and the mat is dried to provide a grass fibre non-woven product having a final moisture content of less than 5% This product is in the form of a rigid board and can be used as acoustic insulation for buildings or vehicles.

Example 4—Preparation of Grass Fibre Non-Woven Thermal Insulation Material

A. 100 Kg of decorticated sisal grass was shredded in a conventional shredder to produce a grass product having an average grass particle size of 10-20 mm and a moisture content of 10-15% by weight.

B. 25 Kg of the decorticated shredded sisal grass fibre and 75 Kg of grass fibre biomass produced according to Example 1 are mixed with continuous dust extraction and then added into airlaid processing machine comprising a dust/fines extractor, spark detector and metal detector. The grass and biomass are mixed with air and the mixed fibres are deposited onto a conveyor to form an elongated non-woven mat having a density of about 40 Kg/m3 and a thickness of about 10 cm.

C. Binder (OC-Biobinder) is added to the mat at about 10% by weight and the mat is dried to provide a grass fibre non-woven product having a final moisture content of less than 5%. This product is in the form of a flexible may that can be rolled up and is suitable for use as thermal insulation for a building.

Example 5—Preparation of Grass Fibre Non-Woven Packaging Material for Heavy Duty Items A. 100 Kg of hemp grass was shredded in a conventional shredder to produce a grass product having an average grass particle size of 10-20 mm and a moisture content of 10-15% by weight.

B. 40 Kg of shredded hemp grass and 60 Kg of grass fibre biomass produced according to Example 1 are mixed with continuous dust extraction and then added into airlaid processing machine comprising a dust/fines extractor, spark detector and metal detector. The grass and biomass are mixed with air and the mixed fibres are deposited onto a conveyor to form an elongated non-woven mat having a density of about 70 Kg/m3 and a thickness of about 5 cm.

C. Binder (OC-Biobinder) is added to the mat at about 10% by weight and the mat is dried to provide a grass fibre non-woven product having a final moisture content of less than 5% by weight. This product is in the form of a rigid board that can be used as packaging material for heavy duty industrial items such as engines or engine parts as a replacement for wood fibre boards.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimed is:

1. A process for producing a non-woven grass fibre product comprising the steps of:
providing a grass fibre biomass obtained by aerobic fermentation of a meadow grass slurry and removal of digestible elements released during aerobic fermentation;
adding at least one non-fermented grass to the grass fibre biomass in which a mixture of non-fermented grass and grass fibre biomass contains 10-50% by weight of non-fermented grass, in which the non-fermented grass is selected from sisal, hemp, cereal, or flax;
mixing and shaping the mixture of non-fermented grass and grass fibre biomass to form a non-woven grass fibre mat,
adding a binding agent to the non-woven grass fibre mat, and
drying the non-woven grass fibre mat to form the non-woven grass fibre product, in which the grass fibre biomass has a moisture content of 5-15% by weight, and in which the grass fibre biomass is treated to size reduce the grass fibres in the biomass.

2. A process according to claim 1, in which the grass fibre biomass is treated to size reduce the grass fibres in the biomass to a size of 1-30 mm.

3. A process according to claim 1, in which the grass fibre biomass is produced in a process comprising the steps of:
mixing meadow grass and an aqueous liquid at a weight ratio of 1:1 to 50:1 to provide a slurry;
incubating the slurry under conditions to allow aerobic fermentation of the grass by microorganisms naturally present in the grass to provide a grass fibre biomass solid phase that is depleted in digestible elements dispersed in a liquid phase; and
separation of the solid phase from the liquid phase to provide the grass fibre biomass.

4. A process according to claim 1, in which the mixture of non-fermented grass and grass fibre biomass comprises a fire-retardant material.

5. A process according to claim 1, in which the mixing and shaping step comprises an air lay process.

6. A process according to claim 1, in which the mixing and shaping step comprises an air lay process and in which the air lay process incorporates a dust extraction step and is configured to provide a non-woven grass fibre mat with a density of 30-80 Kg/m$^3$.

7. A process according to claim 1, in which the adding step comprises adding the binding agent to the non-woven grass fibre mat prior to or during the drying step.

8. A process according to claim 1, in which the non-fermented grass is size reduced prior to addition to the grass fibre biomass.

9. A process according to claim 1, in which the non-fermented grass is size reduced prior to addition to the grass fibre biomass to a grass particle size of about 1-40 mm.

10. A non-woven grass fibre mat having a flexible 3-dimensional structure, and comprising:
aerobically fermented meadow grass fibre biomass that is depleted in digestible material;
at least one non-fermented grass selected from sisal grass, hemp grass, cereal grass or flax grass; and
a binder,
wherein a weight ratio of non-fermented grass to aerobically fermented meadow grass fibre biomass is about 10:90 to 50:50, and
wherein the non-woven grass fibre product has a density of 30-50 Kg/m3.

11. A non-woven grass fibre mat according to claim 10, wherein the non-woven grass fibre product has a density of 300-550 g/m2 at a thickness of 20 mm.

12. A non-woven grass fibre mat according to claim 10, including an outer cover layer selected from a polymer film or mesh cover.

13. A non-woven grass fibre mat according to claim 10, in which the grass fibres in the grass fibre biomass have a size of 1-30 mm.

14. A non-woven grass fibre mat according to claim 10, in which the non-fermented grass has a grass particle size of about 1-40 mm.

15. A system for producing a non-woven grass fibre product, comprising:
a fermentation module configured to produce grass fibre biomass by aerobic fermentation of a meadow grass slurry and removal of digestible elements released during aerobic fermentation;
a non-fermented grass size reduction module to receive non-fermented grass and size reduce the non-fermented grass;
a metering module operably connected to the fermentation module and non-fermented grass size reduction module configured to automatically meter predetermined amounts of the grass fibre biomass and non-fermented grass;
a mixing and shaping module operably connected to the metering module and configured to receive the predetermined amounts of the grass and grass fibre biomass from the metering module and mix and shape to form a non-woven grass fibre mat; and
a binding and drying module operably connected to the mixing and shaping module and configured to receive the non-woven grass fibre mat form the mixing and shaping module, to add a binding agent to the mat, and to dry the mat.

* * * * *